R. BOEKLEN

Hand-Seeder.

No. 14,801. Patented May 6. 1856

UNITED STATES PATENT OFFICE.

REINHOLD BOEKLEN, OF JERSEY CITY, NEW JERSEY.

IMPROVEMENT IN CORN-PLANTERS.

Specification forming part of Letters Patent No. 14,801, dated May 6, 1856.

*To all whom it may concern:*

Be it known that I, REINHOLD BOEKLEN, of Jersey City, in the county of Hudson and State of New Jersey, have invented certain new and useful Improvements in Hand Corn-Planters; and I do hereby declare that the following is a full, clear, and exact description of the same, reference being had to the annexed drawings, forming part of this specification, in which—

Figure 1:
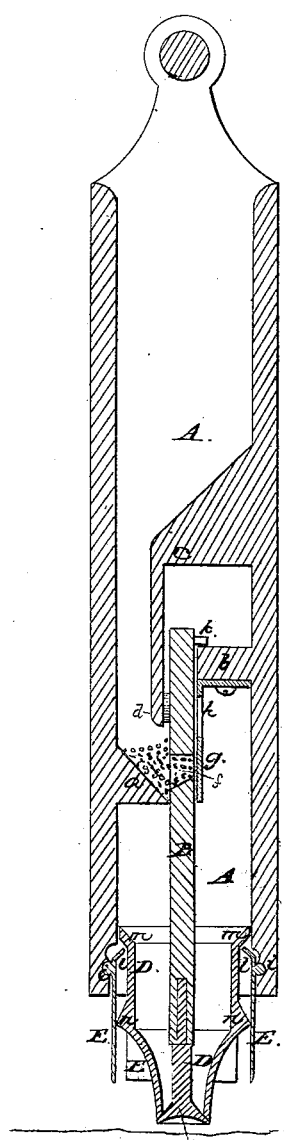
Figure 2:
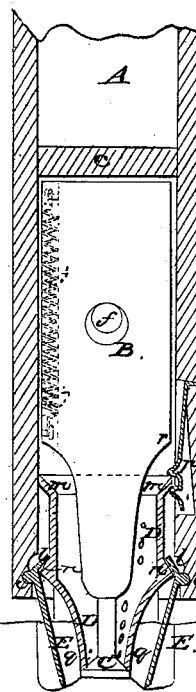
Figure 3:
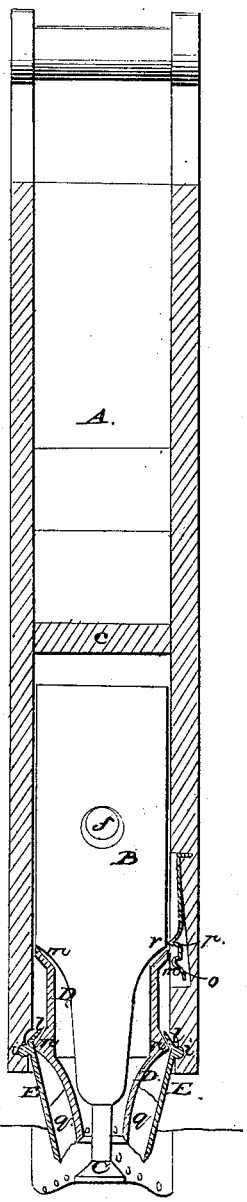

Figure 1 is a central section of a hand corn-planter with my improvements, showing it in the condition it is in before touching the ground. Fig. 2 is a section at right angles to Fig. 1 in the line $x$ $x$, showing its parts in the condition they assume when the plunger is forced into the ground. Fig. 3 is a similar section to Fig. 1, showing the parts in the condition they assume as the seed-tube is being lifted up to draw the plunger from the ground.

Similar letters of reference indicate corresponding parts in the several figures.

This invention consists in a novel contrivance for covering the corn with earth after it is deposited in the ground.

To enable others to make and use the invention, I will proceed to describe its construction and operation.

A is the seed-box or seed-tube, consisting of a long tube of wood or metal, of four-sided or other suitable form, which is to be carried in the hand by a suitable handle, and is fitted with a straight central slide, B, extending all across it, the part of the seed tube or box above the said slide, which is filled or partly filled with corn, being separated from the lower part thereof by two fixed partition-pieces, $a$ and $b$, on opposite sides of the slide. Above the slide there is a fixed stop-piece, $c$, to check the upward movement of the slide B within the box, and to this stop-piece $c$ is attached the stationary cut-off $d$, which is furnished with a brush, $e$, to cut off from the upper part of the box or tube A the quantity of corn which is received within the hole $f$ of the slide. To the partition-piece $b$ is attached a rigid curtain, $g$, in which is a hole, $h$, to allow the corn to escape from the hole $f$ of the slide B into the lower part of the box or tube A. A spring, $j$, is applied between the slide B and the seed box or tube A in such a manner as to force down the slide in the seed box or tube to assist the weight of the slide in keeping the hole $h$ closed by the slide, the said downward movement of the slide in the box being limited by a stop-pin, $k$, which comes in contact with the partition-piece $b$. To the bottom of the slide B is attached rigidly a plunger-valve, C, which combines with a plunger-tube, D, to form a plunger, by which the hole is made in the ground to deposit the seed. The upper part of the plunger-tube D is made larger than the lower part to fit easily to the interior of the seed box or tube A, so as to be capable of sliding freely up and down therein, and the lower part is of the same size as the plunger-valve C, which is beveled to fit to a beveled seat in the bottom of the plunger-tube. Between the extreme lower part of the seed box or tube A and the plunger-tube D, on each side, a plate, E, which I call a "covering-plate," is attached to the seed box or tube, by a knuckle, $i$, or otherwise, in such a manner as to be capable of a swinging movement toward and from the plunger-tube. The covering-plates E E, which are for the purpose of taking up a quantity of earth from the sides of the hole formed by the plunger, have their lower edges sharp, and extend some distance below the bottom of the seed-tube, but not so far below as the plunger-valve does when the latter is kept down by the spring $j$. The upper parts, $l$ $l$, of the covering-plates above the center of motion $i$ $i$ are inclined inward toward the plunger-tube, and the exterior of the plunger-tube has two inclined projections, $m$ $n$, on each side of its exterior, for the purpose of acting upon the covering-plates in a manner that will be hereinafter described. On one side of the interior of seed box or tube A there is attached a spring-catch, $p$, for the purpose, at a certain stage of the operation to be hereinafter described, of catching in a notch, $o$, in one side of the plunger-tube D, to connect the latter with the former.

The entire operation of the planter is effected by a person taking it in one hand by the upper end or handle, walking over the field, and at certain distances dropping the lower end upon the ground with its whole weight, either with or without such additional pressure as may be found necessary. The plunger, which before touching the ground is in the condition shown in Fig. 1, enters the ground to a sufficient depth to make the hole before it is arrested by the increasing resistance of the ground, the covering-plates E E remaining in the meantime spread open, as shown in the same figure, by the lower projections, $n\ n$, on the plunger-tube D, which form bearings for the said plates below their centers of motion $i\ i$, and in that condition entering the ground. After the arrest of the plunger the continued descent of the seed box or tube A brings the inwardly-inclined upper parts of the covering-plates into contact with the inclined upper portions of the projections $n\ n$ of the plunger-tube and causes the said parts $l\ l$ to be thrown outward and the lower parts to be thrown inward toward the plunger-tube, and to grasp a quantity of earth between themselves and the plunger-tube, and it eventually brings the spring-catch over the notch $o$ in the plunger-tube and locks the latter to the seed box or tube. The condition now described is represented in Fig. 2. The operator, who now feels by the resistance offered to the further descent of the seed box or tube by the top of the slide striking the top $c$, that the time has arrived for lifting it, lifts it; but the plunger valve and slide are kept down by their own weight, aided by the spring $j$, and thus an opening is formed between the plunger-valve and bottom of the plunger-tube for the corn, which has passed from the hole $f$ through the hole $h$ and into the plunger-tube during the descent of the seed box or tube, to escape into the ground. During the lifting of the seed box or tube, with the plunger-tube locked to it, the earth $q\ q$, which is within the covering-plates, is lifted by them until a shoulder, $r$, of the slide comes in contact with and forces out the spring-catch $p$, as shown in Fig. 3, so as to liberate the plunger-tube, which falls by its own weight, and its projections $n\ n$, in passing the centers of motion $i\ i$ of the covering-plates, throw out the lower parts thereof and release the earth $q\ q$, which falls back into the hole in the ground just as the plunger-valve begins to be lifted by the stop $b$, acting on the pin $k$, and covers the corn which has been deposited.

What I claim as my invention, and desire to secure by Letters Patent, is—

The employment of one or more covering-plates, E E, applied in connection with the seed box or tube and the plunger, and operating, substantially as herein set forth, to lift a quantity of earth and deposit it over the corn which has been planted.

R. BOEKLEN.

Witnesses:
J. W. COOMBS,
R. MACFARLANE.